US011494710B1

(12) United States Patent
Pickering et al.

(10) Patent No.: US 11,494,710 B1
(45) Date of Patent: Nov. 8, 2022

(54) OPTIMIZATION CONSTRAINT ADAPTATION FOR LONG-TERM TARGET ACHIEVEMENT

(71) Applicant: Kalibrate Technologies Limited, Manchester (GB)

(72) Inventors: Benjamin Pickering, Manchester (GB); Gareth Owen, Manchester (GB); David Leedal, Manchester (GB); Mark Pearce, Manchester (GB); Rebecca Wilson, Manchester (GB)

(73) Assignee: Kalibrate Technologies Limited, Manchester (GB)

( * ) Notice: Subject to any disclaimer, the term of this patent is extended or adjusted under 35 U.S.C. 154(b) by 215 days.

(21) Appl. No.: 16/720,396

(22) Filed: Dec. 19, 2019

(51) Int. Cl.
  *G06Q 10/00* (2012.01)
  *G06Q 10/04* (2012.01)
  *G06Q 10/06* (2012.01)

(52) U.S. Cl.
  CPC ......... *G06Q 10/04* (2013.01); *G06Q 10/0637* (2013.01); *G06Q 10/0639* (2013.01)

(58) Field of Classification Search
  None
  See application file for complete search history.

(56) References Cited

U.S. PATENT DOCUMENTS

| | | | | |
|---|---|---|---|---|
| 6,038,540 A * | 3/2000 | Krist | ................ | G06Q 10/06375 705/7.29 |
| 8,364,519 B1 * | 1/2013 | Basu | ................ | G06Q 10/06393 705/7.38 |
| 9,747,618 B1 * | 8/2017 | Reiss | ................ | G06Q 30/0275 |
| 10,580,094 B1 * | 3/2020 | Haynold | ................ | G06Q 50/06 |
| 11,087,261 B1 * | 8/2021 | Basu | ................ | G06Q 10/0639 |

(Continued)

OTHER PUBLICATIONS

M. J. Grimble and D. Uduehi, "Process control loop benchmarking and revenue optimization," Proceedings of the 2001 American Control Conference. (Cat. No.01CH37148), 2001, pp. 4313-4327 vol. 6, doi: 10.1109/ACC.2001.945655. (Year: 2001).*

(Continued)

*Primary Examiner* — Gurkanwaljit Singh
(74) *Attorney, Agent, or Firm* — Michael Best & Friedrich LLP

(57) ABSTRACT

Methods and systems of optimization constraint adaptation for long-term target achievement. One system includes an electronic processor configured to divide a multiple time-step optimization problem into a plurality of successive single time-step optimization problems. The processor is configured to determine a first optimal variable value for a first single time-step optimization problem and determine a first resulting value of a secondary quantity based on the first optimal variable value. The processor is configured to determine a first divergence of the first resulting value from a first target value and determine a cumulative target divergence based on the first divergence. The processor is configured to determine a first target value adjustment for a second time-step based on the cumulative target divergence, adjust a first original target value of the secondary quantity for the second time-step using the first target value adjustment, and output the adjusted first original target value for display.

20 Claims, 3 Drawing Sheets

(56) References Cited

U.S. PATENT DOCUMENTS

| | | | | |
|---|---|---|---|---|
| 2003/0233304 | A1* | 12/2003 | Dhurandhar | G06Q 40/06 705/36 R |
| 2007/0156555 | A1* | 7/2007 | Orr | G06Q 10/04 705/35 |
| 2007/0299643 | A1* | 12/2007 | Guyaguler | G01V 11/00 703/10 |
| 2009/0112618 | A1* | 4/2009 | Johnson | G16H 40/20 705/2 |
| 2009/0222297 | A1* | 9/2009 | Cao | G06Q 30/0283 705/348 |
| 2013/0275334 | A1* | 10/2013 | Andersen | G06Q 40/06 705/36 R |
| 2014/0089106 | A1* | 3/2014 | Jordan | G06Q 30/0275 705/14.71 |
| 2015/0142872 | A1* | 5/2015 | Polishchuk | G06Q 30/0242 709/203 |
| 2015/0228004 | A1* | 8/2015 | Bednarek | G06Q 30/0633 705/26.8 |
| 2016/0063192 | A1* | 3/2016 | Johnson | G16H 40/20 705/2 |
| 2017/0116552 | A1* | 4/2017 | Deodhar | G06Q 10/0639 |
| 2018/0330447 | A1* | 11/2018 | Slotterback | G06Q 40/06 |
| 2020/0212677 | A1* | 7/2020 | Wolkoff | H02J 3/003 |
| 2020/0364740 | A1* | 11/2020 | Ouimet | G06Q 30/0633 |
| 2021/0107150 | A1* | 4/2021 | Whitman | B25J 9/162 |

OTHER PUBLICATIONS

D. Fox and X. Zeng, "A New Approach to Demand Modelling and Optimisation in Pricing Decision Support Systems," 2013 IEEE International Conference on Systems, Man, and Cybernetics, 2013, pp. 74-79, doi: 10.1109/SMC.2013.20. (Year: 2013).*

Berbeglia, Gerardo, and Gwenaël Joret. "Assortment optimisation under a general discrete choice model: A tight analysis of revenue-ordered assortments." Algorithmica 82.4 (2020): 681-720. (Year: 2019).*

Youney, Justin. "A comparison and evaluation of common PID tuning methods." (2007). (Year: 2007).*

Chebotar, Yevgen, et al. "Combining model-based and model-free updates for trajectory-centric reinforcement learning." International conference on machine learning. PMLR, 2017. (Year: 2017).*

Doraszelski, Ulrich, and Sarit Markovich. "Advertising dynamics and competitive advantage." The RAND Journal of Economics 38.3 (2007): 557-592. (Year: 2007).*

Budhiraja, Amarjit, Lingji Chen, and Chihoon Lee. "A survey of numerical methods for nonlinear filtering problems." Physica D: Nonlinear Phenomena 230.1-2 (2007): 27-36. (Year: 2007).*

International Search Report with Written Opinion for related Application No. PCT/IB2020/061917 dated Mar. 10, 2021 (45 Pages).

Ilich Nesa: "Improving real-time reservoir operation based on combining demand hedging and simple storage management rules", Journal of Hydroinformatics, vol. 13, No. 3, Oct. 26, 2010, pp. 533-544.

Ilich Nesa: "Shortcomings of linear programming in optimizing river basin allocation", Water Resources Research., vol. 44, No. 2, Feb. 2008, 14 Pages.

Gavahi Keyhan et al.: "Adaptive forecast-based real-time optimal reservoir operations: application to Lake Urmia", Journal of Hydroinformatics, vol. 21, No. 5, Jun. 25, 2019, pp. 908-924.

Vaccari Marco et al.: "A Modifier-Adaptation Strategy towards Offset-Free Economic MPC", Processes, vol. 5, No. 4, Dec. 29, 2016, 21 Pages.

* cited by examiner

OPTIMIZATION CONSTRAINT ADAPTATION FOR LONG-TERM TARGET ACHIEVEMENT

TECHNICAL FIELD

Embodiments described herein relate to systems and methods of optimization constraint adaptation for long-term target achievement to, for example, reduce the complexity and related processing time and resource usage of an optimization function associated with a secondary, long-term target.

SUMMARY

A decision support tool may implement an optimization function that provides insight (for example, efficiency related insight) to a provider of a service or product. For example, price optimization software may be used to maximize revenues using a model of a market for a service or product. An optimization function that maximises a single quantity (such as revenue) is known as a single-objective optimization. The results of a single-objective optimization may depend on one or more quantities that change over time (for example, costs, a competitor price, a customer demand, or a combination thereof that can vary seasonally or periodically). This dependency on multiple variables or parameters that may vary over time may necessitate performing a sequence of optimizations over time.

When performing a sequence of objective optimizations, a user may have a long-term target on a secondary quantity that may be dependent on one or more of the same parameters as the single-objective function. In some cases, this long-term target may be a range of values, rather than a single value. For example, when optimizing profit for the purpose of generating a set of optimal prices a long-term target may include a volume of product sold (for example, to match a pre-determined frequency with which the product is replenished). As another example, when optimizing a time and a frequency with which to send a marketing email or other communication, the long-term target may be a total number of communications sent (for example, to avoid alienating a potential customer).

A long-term secondary target may influence individual optimizations via the inclusion of one or more additional constraints that bound the contribution to the long-term secondary target. The one or more additional constraints may represent an upper-bound and a lower-bound on the contribution of the results of each optimization in the sequence to the secondary quantity.

One approach to this optimisation problem whilst ensuring the long-term target is met, is to optimize over a time period to which the long-term target applies. For example, suppose an objective function is given by $f(x,y)$, where x represents the variables over which the optimization is to be performed (i.e., the variables that may be varied during the optimization) and y represents the externalities that modify the objective function over time. Suppose also that a contribution to the secondary quantity is given by $g(x,y)$. This approach, therefore, corresponds to the following mathematical formulation of the problem:

Optimize: $\sum_{i=1}^{n} f(x_i, y_i)$

Subject to: $\sum_{i=1}^{n} g(x_i, y_i) \geq l R_n$ $\sum_{i=1}^{n} g(x_i, y_i) \leq u R_n$ where $x_i$ and $y_i$ are the values of x and y at the ith time-step, $R_n$ is the long-term target over the time-range $t_1, \ldots, t_n$, and $l \in (0,1]$ and $u \in [1, \infty)$ are the lower- and upper-tolerance multipliers on $R_n$.

In some situations, a solution to this optimization problem must be generated very quickly, such that a user may make real-time (or near real-time) decisions based on the output of the optimization. Alternatively or in addition, there may be a level of uncertainty in the values of $y_i$, and, thus, an estimate of the secondary quantity $g(x,y)$ may be used, wherein the value of the quantity observed in the real-world for some set of inputs $x_i$ may not be equal to the theoretical value suggested by $g(x_i,y_i)$. Such a situation may include, for example, the generation of optimal fuel prices.

In such situations as well as other situations, this approach may suffer from many disadvantages and shortcomings. For example, when a long-term goal is set over a large number of time periods, the dimension of the optimization region becomes extremely large, which increases a computation time associated with the optimization process. For example, in some instances, the dimension of the optimization region may be so large that by the time the optimization process is performed, the result (or solution) of the optimization process may already be outdated. Additionally, when a user needs to make real-time (or near real-time) decisions based on the result of an optimization process having a large optimization region, this approach is insufficient. Accordingly, this approach suffers from the shortcoming of inefficient handling of optimization processes having a large optimization region.

Alternatively or in addition, the optimization problem requires accurate estimates of the $y_i$ variables for a potentially substantial period in the future. When the estimates of the $y_i$ variables are volatile over the period under consideration, the estimates of the $y_i$ variables may not be easily obtained. Alternatively or in addition, the solution obtained does not change to reflect the actual achieved values of $g(x,y)$ once these values are known. Accordingly, this approach to solving the outlined optimization problem is not suitable for situations when a solution to the optimization problem may need to be generated very quickly, when an optimization region of the optimization problem is large, when there may be a level of uncertainty in the values of $y_i$, and the like.

Accordingly, to address these and other problems with existing approaches to such optimisation problems whilst ensuring a long-term target is met, embodiments described herein provide systems and methods of optimization constraint adaptation for long-term target achievement. In particular, embodiments described herein convert a larger optimization problem across multiple time-steps (for example, a multiple time-step optimization problem) into a sequence of successive single time-step optimization problems, where a long-term constraint on a secondary quantity is apportioned across the time-steps appropriately. The single time-step target values may be updated over time in an effort to ensure that the long-term target value of the secondary quantity is satisfied in as efficient of a manner as possible. It is the combination of the smaller sequential optimisation problems (for example, a plurality of successive single time-step optimization problems) and the updating (or adjusting) of the target values of a quantity of interest over time through the consideration of recent cumulative target divergence that provides a solution to the overall optimization to be obtained in an efficient manner while also attempting to achieve a desired overall target as closely as possible.

For example, some embodiments provide a system of optimization constraint adaptation for long-term target achievement. The system including an electronic processor configured to receive a request associated with a multiple time-step optimization problem. The electronic processor is also configured to divide the multiple time-step optimization problem into a plurality of successive single time-step optimization problems, where each one of the plurality of successive single time-step optimization problems is associated with a time-step of the multiple time-step optimization problem. The electronic processor is also configured to determine a first optimal variable value for a first single time-step optimization problem for a first time-step. The electronic processor is also configured to determine a first resulting value of a secondary quantity based on the first optimal variable value. The electronic processor is also configured to determine a first divergence of the first resulting value from a first target value of the secondary quantity. The electronic processor is also configured to determine a cumulative target divergence based on the first divergence. The electronic processor is also configured to determine a first target value adjustment for a second time-step based on the cumulative target divergence. The electronic processor is also configured to adjust a first original target value of the secondary quantity for the second time-step based on the first target value adjustment and output the adjusted first original target value for display.

Other embodiments provide a method of optimization constraint adaptation for long-term target achievement. The method includes receiving, with an electronic processor, a request associated with a multiple time-step optimization problem. The method also includes dividing, with the electronic processor, the multiple time-step optimization problem into a plurality of successive single time-step optimization problems, where each of the plurality of successive single time-step optimization problems is associated with a time-step of the multiple time-step optimization problem. The method also includes determining, with the electronic processor, a set of optimal variable values for a first single time-step optimization problem for a first time-step. The method also includes determining, with the electronic processor, a resulting value of a secondary quantity based on the set of optimal variable values. The method also includes determining, with the electronic processor, a divergence of the resulting value from a target value of the secondary quantity. The method also includes determining, with the electronic processor, a cumulative target divergence based on the divergence. The method also includes determining, with the electronic processor, a set of target value adjustments for a plurality of succeeding time-steps based on the cumulative target divergence. The method also includes adjusting, with the electronic processor, a set of original target values of the secondary quantity for the plurality of succeeding time-steps based on the set of target value adjustments. The method also includes outputting, with the electronic processor, the adjusted set of original target values for display.

Still other embodiments provide non-transitory computer-readable medium storing instructions executable by at least one electronic processor to perform a set of functions. The set of functions including receiving a request associated with a multiple time-step optimization problem. The set of functions also includes dividing the multiple time-step optimization problem into a plurality of successive single time-step optimization problems, where each of the plurality of successive single time-step optimization problems is associated with a time-step of the multiple time-step optimization problem. The set of functions also includes determining a first set of optimal variable values for a first single time-step optimization problem for a first time-step. The set of functions also includes determining a first resulting value of a secondary quantity based on the first set of optimal variable values. The set of functions also includes determining a first divergence of the first resulting value from a first target value of the secondary quantity. The set of functions also includes determining a cumulative target divergence based on the first divergence. The set of functions also includes determining a first set of target value adjustments for a first plurality of succeeding time-steps based on the cumulative target divergence, where the first plurality of succeeding time-steps are associated with a first subset of the plurality of successive single time-step optimization problems succeeding the first single time-step optimization problem. The set of functions also includes adjusting a first set of original target values of the secondary quantity for the first plurality of succeeding time-steps based on the first set of target value adjustments and outputting the adjusted first set of original target values for display.

BRIEF DESCRIPTION OF THE DRAWINGS

Embodiments will now be described, by way of example, with reference to the accompanying drawings, in which.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
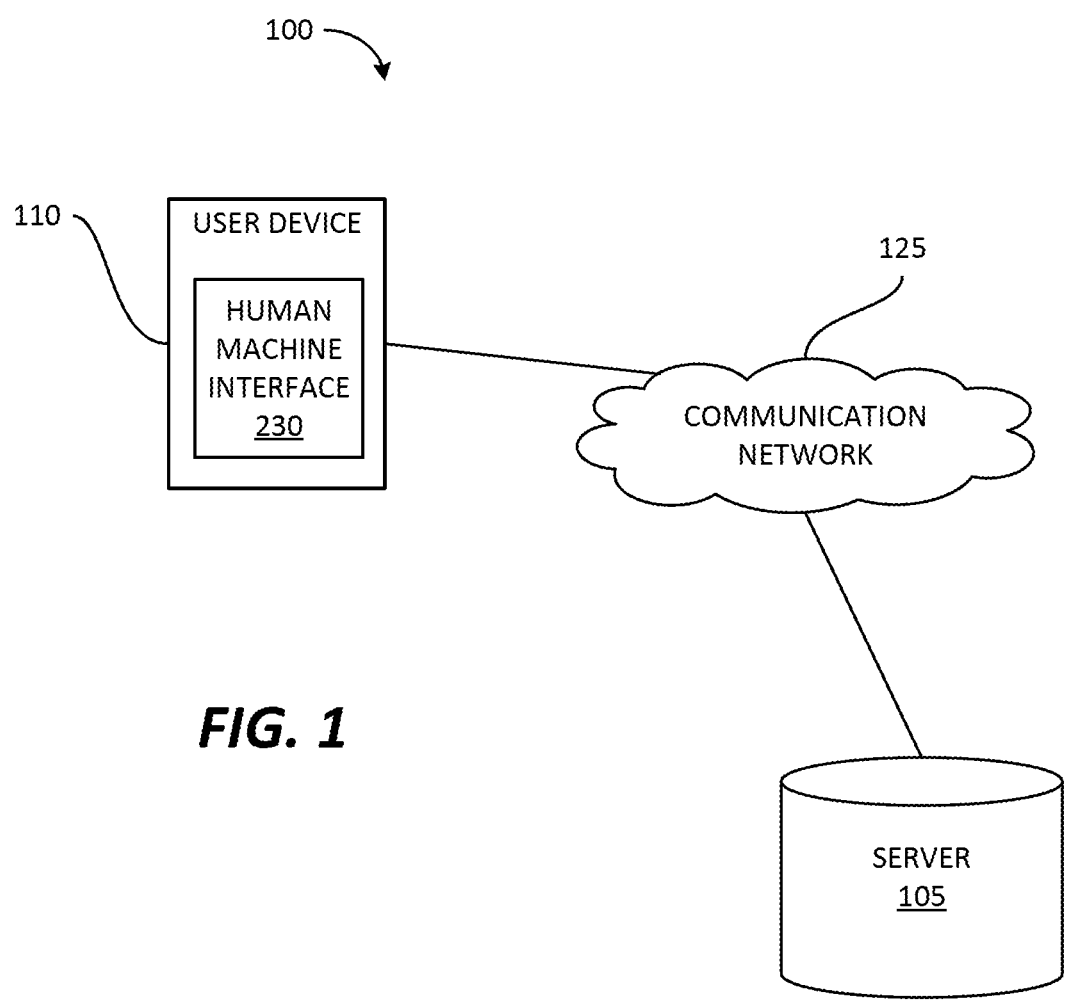
FIG. 1 illustrates a system of optimization constraint adaptation for long-term target achievement according to some embodiments.

FIG. 1 schematically illustrates a system 100 of optimization constraint adaptation for long-term target achievement according to some embodiments. The system 100 includes a server 105 and a user device 110. In some embodiments, the system 100 includes fewer, additional, or different components than illustrated in FIG. 1. For example, the system 100 may include multiple servers 105, multiple user devices 110, or a combination thereof. Also, in some embodiments, the server 105 and the user device 110 may be combined into a single device or server. In other embodiments, one or more of the server 105 and the user device 110 are distributed among multiple devices or servers.

The server 105 and the user device 110 communicate over one or more wired or wireless communication networks 125. Portions of the communication networks 125 may be implemented using a wide area network, such as the Internet, a local area network, such as a Bluetooth™ network or W-Fi, and combinations or derivatives thereof. It should be understood that in some embodiments, additional communication networks may be used to allow one or more components of the system 100 to communicate. Also, in some embodiments, components of the system 100 may communicate directly as compared to through a communication network 125 and, in some embodiments, the components of the system 100 may communicate through one or more intermediary devices not shown in FIG. 1.

Figure 2:
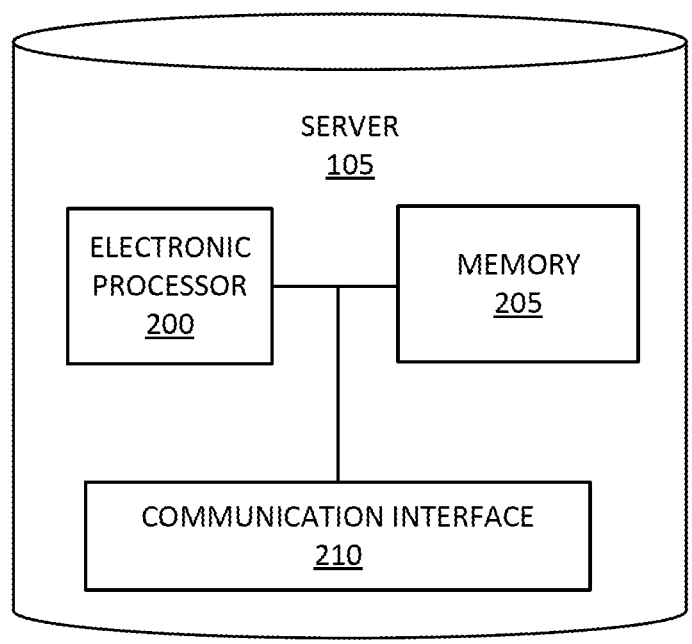
FIG. 2 illustrates a server of the system of FIG. 1 according to some embodiments.

The server 105 may be a computing device (for example, a desktop computer, a terminal, a workstation, a laptop computer, a tablet computer, or the like). As illustrated in FIG. 2, the server 105 includes an electronic processor 200 (for example, a microprocessor, an application-specific integrated circuit (ASIC), or another suitable electronic device), a memory 205 (for example, a non-transitory, computer-readable medium), and a communication interface 210. The electronic processor 200, the memory 205, and the communication interface 210 communicate wirelessly, over one or more communication lines or buses, or a combination thereof. It should be understood that the server 105 may include additional components than those illustrated in FIG. 2 in various configurations and may perform additional functionality than the functionality described herein. For example, in some embodiments, the functionality (or a portion thereof) described herein as being performed by the server 105 may be distributed among servers or devices (including as part of services offered through a cloud service).

The communication interface 210 allows the server 105 to communicate with devices external to the server 105. For example, as illustrated in FIG. 1, the server 105 may communicate with the user device 110 through the communication interface 210. The communication interface 210 may include a port for receiving a wired connection to an external device (for example, a universal serial bus ("USB") cable and the like), a transceiver for establishing a wireless connection to an external device (for example, over one or more communication networks 125, such as the Internet, local area network ("LAN"), a wide area network ("WAN")), and the like), or a combination thereof.

The electronic processor 200 is configured to access and execute computer-readable instructions ("software") stored in the memory 205. The software may include firmware, one or more applications, program data, filters, rules, one or more program modules, and other executable instructions. For example, the software may include instructions and associated data for performing a set of functions, including the methods described herein.

The user device 110 is a computing device and may include a desktop computer, a terminal, a workstation, a laptop computer, a tablet computer, a smart watch or other wearable, a smart television or whiteboard, or the like. Although not illustrated, in some embodiments, the user device 110 includes similar components to the server 105 (for example, a communication interface, a memory, and an electronic processor). In other embodiments, the user device 110 includes more or less components than the server 105. For example, as illustrated in FIG. 1, the user device 110 may include a human-machine interface 230 for interacting with a user. The human-machine interface 230 may include one or more input devices, one or more output devices, or a combination thereof. For example, the human-machine interface 230 may include a keyboard, a cursor-control device (for example, a mouse), a touch screen, a scroll ball, a mechanical button, a display device (for example, a liquid crystal display ("LCD")), a printer, a speaker, a microphone, or a combination thereof. In some embodiments, the user device 110 is combined with the server 105.

A user may use the user device 110 to implement optimization. For example, a user may interact with optimization software (for example, a decision support tool, a price optimization application, another type of optimization application, or a combination thereof) through one or more user interfaces that may prompt the user to input various data and may provide data to the user. In some embodiments, the optimization software is stored in a memory of the user device 110. In other embodiments, the optimization software is stored in the memory 205 of the server 105. Accordingly, in such embodiments, the optimization software may be a hosted service offered by a third-party provider. The user may interact with the optimization software (via the user device 110) by accessing the optimization software and using the optimization software to define (or provide) an optimization problem (for example, a multiple time-step optimization problem). In some embodiments, the user also interacts with the optimization software (via the user device 110) to view and interact with a result (or solution) to the optimization problem. For example, the user device 110 may display the result of the optimization problem (via the human machine interface 230) to a user of the user device 110. Alternatively or in addition, the user of the user device 110 may interact with the result of the optimization problem (via the human machine interface 230) by outputting the result of the optimization problem to an additional device. Alternatively or in addition, the user may perform (via an electronic processor of the user device 110 executing instructions) additional processing, reporting, and the like based on the results (or solution). Furthermore, in some embodiments, the result of the optimization problem may be transmitted to an additional device and used to control the device. For example, the additional device may be a remote display device (for example, a pole sign, a billboard, and the like), which may receive the result and adjust displayed information accordingly. In some embodiments, the result may be automatically transmitted (over one or more communication networks) to the remote display device automatically. In other embodiments, a user may initiation the transmission of the result to the remote display device.

As noted above, the conventional approach to solving optimization problems is not suitable for situations when a solution to the optimization problem may need to be generated very quickly, when an optimization region of the optimization problem is large, when there may be a level of uncertainty in the values of $y_i$, and the like. Accordingly, to address these and other problems with existing approaches to such optimisation problems whilst ensuring a long-term target is met, embodiments described herein provide systems and methods of optimization constraint adaptation for long-term target achievement. The systems and methods described herein improve existing technology for solving optimization problems by allowing the problem to be calculated faster and, thus, using fewer resources (e.g., computing resources, etc.) and more accurately. Accordingly, the methods and systems described herein represent an improvement to technology (for example, an improvement over existing technology (whether manual or automated) for solving optimization problems). Furthermore, it should be understood that the methods and systems may be described herein as being used to generate an optimal price, such as for fuel, the methods and systems described herein provide the improvements noted above for any type of optimization problem regardless of the specific result, parameters, and the like used with the problem. In particular, the embodiments described herein have applicability outside of the fuel industry and outside of generating optimal prices.

Figure 3:
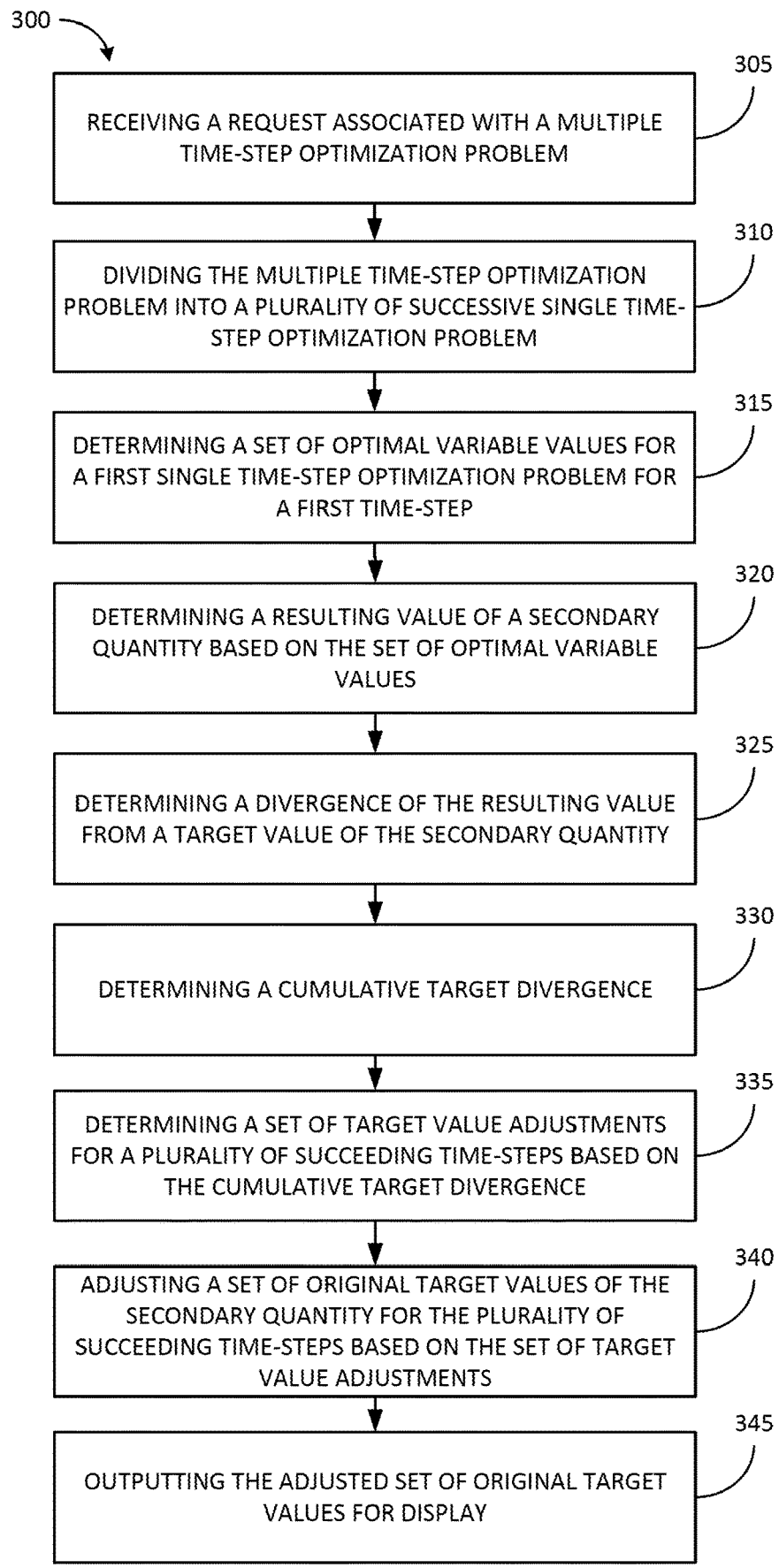
FIG. 3 is a flowchart illustrating a method of optimization constraint adaptation for long-term target achievement performed by the system of FIG. 2 according to some embodiments.

FIG. 3 is a flowchart illustrating a method 300 of optimization constraint adaptation for long-term target achievement using the system 100 of FIG. 1 according to some embodiments. The method 300 is described herein as being performed by the server 105 (the electronic processor 200 executing instructions). However, as noted above, the functionality performed by the server 105 (or a portion thereof) may be performed by other devices, including, for example, the user device 110 (via an electronic processor executing instructions).

As illustrated in FIG. 3, the method 300 includes receiving, with the electronic processor 200, a request associated with a multiple time-step optimization problem (at block 305). In some embodiments, the request defines one or more parameters, such as a primary (or main) quantity and a secondary quantity, of the multiple time-step optimization problem. For example, the request may be associated with a multiple time-step optimization problem for optimizing profit for the purpose of generating optimal prices (for example, fuel prices) as a primary quantity with a volume of product sold as a long-term secondary quantity (for example, to match a pre-determined frequency with which the product stocks, such as fuel, are replenished). As another example, the request may be associated with a multiple time-step optimization problem for optimizing a time and frequency with which to send a marketing email as a primary quantity with a limit of total number of emails sent to avoid alienating a potential customer as a long-term secondary quantity. In some embodiments, the request also defines a duration or time period (for example, an optimization region) associated with the long-term secondary quantity. The electronic processor 200 may receive the request from the user device 110, another device, or a combination thereof (via the communication network 135).

In some embodiments, the electronic processor 200 receives the request associated with the multiple time-step optimization problem in response to a manual trigger. A manual trigger may include, for example, a user submitting the request by interacting with the user device 110. In other words, in some embodiments, the request may be manually transmitted to the electronic processor 200 from the user device 110 by a user interacting with the user device 110 (i.e., submitting a request defining a multiple time-step optimization problem). Alternatively or in addition, in some embodiments, the electronic processor 200 receives the request in response to an automatic trigger. An automatic trigger may include, for example, a price change of a competitor product, a competitor service, or a combination thereof. In other words, in some embodiments, the request may be automatically transmitted to the electronic processor 200 (for example, from the user device 110, another device, or a combination thereof) when an automatic trigger is detected (for example, a price change of a competitor product, a competitor service, or a combination thereof associated with the multiple time-step optimization problem).

As illustrated in FIG. 3, the electronic processor 200 divides the multiple time-step optimization problem into a plurality (or sequence) of successive single time-step optimization problems (at block 310). In some embodiments, each of the successive single time-step optimization problems is associated with a time-step of the multiple time-step optimization problem. In other words, the electronic processor 200 splits (or divides) the multiple time-step optimization problem into n successive single time-step optimization problems. Each one of the successive single time-step optimization problems is associated with each time-step $(t_1, \ldots, t_n)$ in a future time horizon. For a time-step $(t_i)$, the corresponding single time-step optimization problem may be expressed mathematically as:

Optimize: $f(x_i, y_i)$

Subject to: $g(x_i, y_i) \geq lr_i^{(0)}$ $g(x_i, y_i) \leq ur_i^{(0)}$

Here $r_i^{(0)}$ defines a target value for a secondary quantity for time-step $t_i$ only, having been calculated at time-step 0. In other words, $r_i^{(0)}$ is the original target value for time-step $t_i$, with the long-term running-target $R_i = \Sigma_{j=1}^{i} r_j^{(0)}$ for each $i=1, \ldots, n$.

After dividing the multiple time-step optimization problem into the plurality of successive single time-step optimization problems, the electronic processor 200 then determines a set of optimal variable values (i.e., one or more optimal variable values) for a first single time-step optimization problem for a first time-step $(t_i)$ (at block 315). An optimal variable value is an optimal value of a variable with respect to achieving optimization of an associated quantity. For example, in the context of optimizing profit from selling a product or service, an optimal variable value may refer to an optimal price of the product or service (for example, an optimal fuel price). The electronic processor 200 determines the set of optimal variable values by running (or performing) the first single time-step optimization problem for the first time-step ($t_i$). The set of optimal variable values may be denoted by $\hat{x}_i$.

The electronic processor 200 also determines a resulting value of a secondary quantity based on the set of optimal variable values ($\hat{x}_i$) (at block 320). For example, in some embodiments, the electronic processor 200 determines the resulting value of the secondary quantity by implementing the set of optimal variables ($\hat{x}_i$) at the first time-step ($t_i$). The resulting value may be denoted by $s_i$. The resulting value ($s_i$) generally represents a contribution to the long-term secondary quantity.

As illustrated in FIG. 3, the electronic processor 200 then determines a divergence of the resulting value ($s_i$) from a target value ($r_i$) of the secondary quantity (at block 325). A divergence represents a difference between the resulting value ($s_i$) from a target value ($r_i$) of the secondary quantity. A target value of the secondary quantity may represent a target contribution (or goal) to the long-term secondary quantity for a current time-step (for example, the first time-step ($t_i$)). In other words, the electronic processor 200 calculates a difference between the contribution to the long-term secondary quantity at the first time-step ($t_i$) (i.e., the resulting value ($s_i$) of the secondary quantity) and a target contribution to the long-term secondary quantity at the first time-step ($t_i$) (i.e., the target value ($r_i$) of the secondary quantity). The divergence may be denoted by $d_i$, where:

$$d_i = s_i - r_i.$$

After determining the divergence ($d_i$) of the resulting value ($s_i$) from the target value ($r_i$) of the secondary quantity (at block 325), the electronic processor 200 determines a cumulative target divergence (at block 330). The cumulative target divergence represents a cumulative divergence of a resulting value (an actual contribution to the long-term secondary quantity) from a target value (a target contribution to the long-term secondary quantity) over a time-horizon including the current time-step (for example, the first time-step ($t_i$)) and any preceding time-steps (for example, $t_{i-1}, \ldots, t_{i-n}$). The cumulative target divergence may be denoted by $D_i$, where:

$$D_i = \Sigma_{j=1}^{i} d_j.$$

In some embodiments, the electronic processor 200 determines a set of weights (i.e., one or more weights). The set of weights may be used to apportion the cumulative target divergence as adjustments on one or more target values for the remaining time-steps in the time-horizon (for example, $r_{i+1}, \ldots, r_{i+n}$).

In some embodiments, the electronic processor 200 determines the set of weights based on a responsiveness preference that identifies a preference for responsiveness in recovering a cumulative target divergence. A responsiveness preference may be specified by a user via the user device 110. For example, a user may include a responsiveness preference as part of the request received by the electronic processor 200. Accordingly, in some embodiments, the electronic processor 200 determines the responsiveness preference based on the request received at block 305. Alternatively or in addition, the electronic processor 200 may determine a responsiveness preference based on a stored preference or profile. In some embodiments, the greater the responsiveness, the more quickly (or aggressively) a cumulative target divergence is recovered. In some embodiments, the electronic processor 200 determines (or creates) a set of weights that encode the responsiveness preference. For example, a set of weights may be a set of exponentially decaying values with the responsiveness preference encoded through the half-life.

Alternatively or in addition, in some embodiments, the electronic processor 200 determines the set of weights based on a time-based variation in the secondary quantity. In other words, the set of weights may encapsulate one or more time-based variations in the secondary quantity (for example, variable by day of the week). In some embodiments, the electronic processor 200 determines the time-based variation in the secondary quantity using recent observed values of the secondary quantity.

Alternatively or in addition, in some embodiments, the electronic processor 200 determines the set of weights by determining a first sub-set of weights (or a first sub-weight) based on a preference for responsiveness in recovering a target divergence and determining a second sub-set of weights (or a second sub-weight) based on a time-based variation in the secondary quantity. After determining the first sub-set of weights and the second sub-set of weights, the electronic processor 200 may multiple the first sub-set of weights and the second sub-set of weights. The electronic processor 200 may then rescale the result of multiplying the first sub-set of weights and the second sub-set of weights such that the set of weights satisfy the preference for responsiveness in recovering the target divergence. In some embodiments, the values of the sets of weights are truncated to zero (0) once the cumulative sum of the values reaches one (1). These final weights represent the proportions of the cumulative target divergence (for example, target value adjustments) to be apportioned to the target values for the secondary quantity of each time-step in the forthcoming time-horizon (for example, a plurality of succeeding time-steps ($t_{i+1}, \ldots, t_n$)).

As seen in FIG. 3, the electronic processes 200 then determines a set of target value adjustments (i.e., one or more target value adjustments) for a plurality of succeeding time-steps ($t_{i+1}, \ldots, t_n$) based on the cumulative target divergence ($D_i$) (at block 335). As noted above, a target value adjustment may represent the proportions of the cumulative target divergence (for example, target value adjustments) to be apportioned to the target values for the secondary quantity of each time-step in the forthcoming time-horizon (for example, a plurality of succeeding time-steps ($t_{i+1}, \ldots, t_n$)). Accordingly, in some embodiments, the electronic processor 200 determines the set of target value adjustments for the secondary quantity by multiplying the cumulative target divergence ($D_i$) with the set of weights. In other words, the electronic processor 200 may multiply the cumulative target divergence ($D_i$) with the set of weights to obtain the set of target value adjustments for each succeeding time-step ($t_{i+1}, \ldots, t_n$). The set of target value adjustments may be denoted by $A_i$, where:

$$A_i = \{a_{i+1}, \ldots, a_n\}.$$

After determining the set of target value adjustments ($A_i$) for the plurality of succeeding time-steps ($t_{i+1}, \ldots, t_n$) (at block 335), the electronic processor 200 adjusts a set of original target values ($r_i$) (i.e., one or more original target values) of the secondary quantity for the plurality of succeeding time-steps ($t_{i+1}, \ldots, t_n$) based on the set of target value adjustments ($A_i$) (at block 340). The electronic processor 200 may adjust the set of original target values ($r_i$) of the secondary quantity by replacing the set of original target values ($r_i$) of the secondary quantity with the set of adjusted target values ($A_i$) of the secondary quantity. In some embodiments, the electronic processor 200 determines a set of adjusted target values of the secondary quantity by adding the set of target value adjustments ($A_i$) to the set of original target values ($r_i$) of the secondary quantity.

In other words, the electronic processor 200 may add the target value adjustments ($A_i$) to the set of original target values for the remaining time-steps (e.g., the plurality of succeeding time-steps) in the time horizon, $\{r_{i+1}, \ldots, r_n\}$, to obtain one or more adjusted target values for $t_{i+1}, \ldots, t_n$. The set of adjusted target values calculated at the first time-step $t_i$ may be denoted by:

$$r^{(i)} = \{r_{i+1}^{(i)}, \ldots, r_n^{(i)}\} = \{r_j + a_j\}_{j=i+1}^n$$

where the electronic processor 200 may replace the set of previous targets $r^{(i-1)}$ with the set of new adjusted target values $r^{(i)}$. It should be understood that the target value adjustments ($A_i$) are being added to the original target values $\{r_{i+1}, \ldots, r_n\}$, rather than one or more target values determined at a previous time-step $\{r_{i+1}^{(i-1)}, \ldots, r_n^{(i-1)}\}$.

Once the electronic processor 200 adjusts the set of original target values ($r_i$) of the secondary quantity for the plurality of succeeding time-steps ($t_{i+1}, \ldots, t_n$) (at block 340), the electronic processor 200 outputs the adjusted set of original target values ($r^{(i)}$) for display (at block 345). In some embodiments, the electronic processor 200 outputs the adjusted set of original target values ($r^{(i)}$) to the user device 110 for display. For example, as noted above, the user device 110 may display the result of the optimization problem (via the human machine interface 230) to a user of the user device 110. In some embodiments, the electronic processor 200 automatically outputs the adjusted set of original target values ($r^{(i)}$) to another device, such as a remote display device (for example, a pole sign, a billboard, and the like).

It should be understood that, in some embodiments, the electronic processor 200 performs one or more of the method steps of blocks 315-345 for each time-step $t_i \in \{t_1, \ldots, t_n\}$. Accordingly, in some embodiments, the electronic processor 200 repeats one or more of the method steps of blocks 315-345 for a second time-step ($t_{i+1}$), a third time-step ($t_{i+2}$), another future time-step ($t_n$), or a combination thereof. In some embodiments, the electronic processor 200 sequentially repeats one or more of the method steps of blocks 315-345 for a succeeding time-step ($t_{i+1}, \ldots, t_n$). For example, in some embodiments, the electronic processor 200 determines a second optimal variable value ($\hat{x}_{i+1}$) for a second single time-step optimization problem for the second time-step ($t_{i+1}$). Based on the set of second optimal variable values ($\hat{x}_{i+1}$), the electronic processor 200 determines a second resulting value ($s_{i+1}$) of the secondary quantity. The electronic processor 200 also determines a second divergence ($d_{i+1}$) of the second resulting value ($s_{i+1}$) from a second target value ($r_{i+1}$) of the secondary quantity. The electronic processor 200 re-determines the cumulative target divergence ($D_{i+1}$) based on the first divergence ($d_i$) and the second divergence ($d_{i+1}$). After re-determining the cumulative target divergence ($D_{i+1}$), the electronic processor 200 may determine a second target value adjustment ($A_{i+1}$) for a third time-step ($t_{i+2}$) based on the re-determined cumulative target divergence ($D_{i+1}$). In some embodiments, the third time-step ($t_{i+2}$) is associated with a third single time-step optimization problem succeeding the second single time-step optimization problem. The electronic processor 200 may adjust a second original target value ($r_{i+1}$) of the secondary quantity for the second time-step ($t_{i+1}$) based on the second target value adjustment ($A_{i+1}$) and output the adjusted second original target value ($r^{(i+1)}$) for display.

Furthermore, although specific embodiments of the invention have been described above, it will be appreciated that various modifications can be made to the described embodiments without departing from the spirit and scope of the present invention. That is, the described embodiments are to be considered in all respects exemplary and non-limiting. In particular, where a particular form has been described for particular processing, it will be appreciated that such processing may be carried out in any suitable form arranged to provide suitable output data.

What is claimed is:

1. A system of optimization constraint adaptation for long-term target achievement, the system comprising:

a communication interface communicating with a remote device over a communication network, the remote device including at least one selected from a group consisting of a pole sign and a billboard; and an electronic processor configured to, in response to receiving an automatic trigger via the communication interface, wherein the automatic trigger includes a detected change in at least one of a competitor product and a competitor service:

divide a multiple time-step multiple-objective optimization problem into a plurality of successive single time-step optimization problems, wherein each one of the plurality of successive single time-step optimization problems is associated with a time-step of the multiple time-step multiple-objective optimization problem, the multiple time-step multiple-objective optimization problem associated with a first parameter to be optimized and a secondary parameter to be optimized, the first parameter being different than the secondary parameter, determine a first optimal variable value for a first single time-step optimization problem for a first time-step, the optimal variable value optimizing the first parameter, determine a first resulting value of the secondary parameter based on the first-optimal variable value, determine a first divergence of the first resulting value from a first target value of the secondary parameter, determine a cumulative target divergence based on the first divergence, determine a first target value adjustment for a second time-step based on the cumulative target divergence, adjust a first original target value of the secondary parameter for the second time-step based on the first target value adjustment, and automatically output, via the communications interface, the adjusted first original target value to the remote device to control the remote device.

2. The system of claim 1, wherein the electronic processor is further configured to determine a second optimal variable value for a second single time-step optimization problem for the second time-step, determine a second resulting value of the secondary parameter based on the second optimal variable value, determine a second divergence of the second resulting value from a second target value of the secondary parameter, re-determine the cumulative target divergence based on the first divergence and the second divergence, determine a second target value adjustment for a third time-step based on the re-determined cumulative target divergence, wherein the third time-step is associated with a third single time-step optimization problem succeeding the second single time-step optimization problem, adjust a second original target value of the secondary parameter for the second time-step based on the second target value adjustment, and output the adjusted second original target value for display.

3. The system of claim 1, wherein the second time-step is associated with a second single time-step optimization problem succeeding the first single time-step optimization problem.

4. The system of claim 1, wherein the electronic processor is configured to determine the first optimal variable value for the first time-step by performing the first single time-step optimization problem for the first time-step.

5. The system of claim 1, wherein the electronic processor is configured to determine a weight, wherein the first target value adjustment for the second time-step is based on the weight and the cumulative target divergence.

6. The system of claim 5, wherein the electronic processor is configured to determine the weight based on a preference for responsiveness in recovering a target divergence.

7. The system of claim 5, wherein the electronic processor is configured to determine the weight based on a time-based variation in the secondary parameter.

8. The system of claim 5, wherein the electronic processor is configured to determine the weight by multiplying a first sub-weight based on a preference for responsiveness in recovering a target divergence and a second sub-weight based on a time-based variation in the secondary parameter, and rescaling a result of multiplying the first sub-weight and the second sub-weight such that the weight satisfies the preference for responsiveness in recovering the target divergence.

9. The system of claim 5, wherein the electronic processor is configured to determine the first target value adjustment by multiplying the cumulative target divergence and the weight, wherein the first target value adjustment is a result of multiplying the cumulative target divergence and the weight.

10. The system of claim 1, wherein the electronic processor is configured to determine an adjusted target value of the secondary parameter by adding the first target value adjustment to the first original target value of the secondary parameter.

11. The system of claim 10, wherein the electronic processor is configured to adjust the first original target value of the secondary parameter for the second time-step by replacing the first original target with the adjusted target value of the secondary parameter.

12. A method of optimization constraint adaptation for long-term target achievement, the method comprising:

receiving, with an electronic processor from a communication interface communicating with a user device including a human-machine interface over a communication network, a request associated with a multiple time-step multiple-objective optimization problem, the multiple time-step multiple-objective optimization program associated with a first parameter to be optimized and a secondary parameter to be optimized, the first parameter being different than the secondary parameter, dividing, with the electronic processor, the multiple time-step multiple-objective optimization problem into a plurality of successive single time-step optimization problems, wherein each of the plurality of successive single time-step optimization problems is associated with a time-step of the multiple time-step multiple-objective optimization problem, determining, with the electronic processor, a set of optimal variable values for a first single time-step optimization problem for a first time-step, the set of optimal variable values optimizing the first parameter, determining, with the electronic processor, a resulting value of the secondary parameter based on the set of optimal variable values, determining, with the electronic processor, a divergence of the resulting value from a target value of the secondary parameter, determining, with the electronic processor, a cumulative target divergence based on the divergence, determining, with the electronic processor, a set of target value adjustments for a plurality of succeeding time-steps based on the cumulative target divergence, adjusting, with the electronic processor, a set of original target values of the secondary parameter for the plurality of succeeding time-steps based on the set of target value adjustments, and automatically outputting, with the electronic processor, the adjusted set of original target values to a remote device over one or more communication networks to control the remote device, the remote device including at least one selected from a group consisting of a pole sign and a billboard.

13. The method of claim 12, further comprising:

determining a set of weights, wherein the set of target value adjustments for the plurality of succeeding time-steps is based on the set of weights and the cumulative target divergence.

14. The method of claim 13, wherein determining the set of weights includes determining the set of weights based on at least one selected from a group consisting of a preference for responsiveness in recovering a target divergence and a time-based variation in the secondary parameter.

15. The method of claim 13, wherein determining the set of weights includes multiplying a first sub-set of weights based on a preference for responsiveness in recovering a target divergence and a second sub-set of weights based on a time-based variation in the secondary parameter; and rescaling a result of multiplying the first sub-set of weights and the second sub-set of weights such that the set of weights satisfy the preference for responsiveness in recovering the target divergence.

16. The method of claim 12, wherein adjusting the set of original target values includes determining a set of adjusted target values, wherein the set of adjusted target values is a sum of the set of target value adjustments and the set of original target values, and replacing the set of original target values with the set of adjusted target values.

17. A non-transitory computer-readable medium storing instructions executable by at least one electronic processor to perform a set of functions, the set of functions comprising:

receiving via a communication interface communicating with a user device including a human-machine interface over a communication network a request associated with a multiple time-step multiple-objective optimization problem, the multiple time-step multiple-objective optimization problem associated with a first parameter to be optimized and a secondary parameter to be optimized, the first parameter being different than the secondary parameter, dividing the multiple time-step multiple-objective optimization problem into a plurality of successive single time-step optimization problems, wherein each of the plurality of successive single time-step optimization problems is associated with a time-step of the multiple time-step multiple-objective optimization problem, determining a first set of optimal variable values for a first single time-step optimization problem for a first time-step, the first set of optimal variable values optimizing the first parameter, determining a first resulting value of the secondary parameter based on the first set of optimal variable values, determining a first divergence of the first resulting value from a first target value of the secondary parameter, determining a cumulative target divergence based on the first divergence, determining a first set of target value adjustments for a first plurality of succeeding time-steps based on the cumulative target divergence, wherein the first plurality of succeeding time-steps are associated with a first subset of the plurality of successive single time-step optimization problems succeeding the first single time-step optimization problem, adjusting a first set of original target values of the secondary parameter for the first plurality of succeeding time-steps based on the first set of target value adjustments, and outputting, via the communication interface, the adjusted first set of original target values for display on the human-machine interface of the user device and transmission, over one or more communication networks, of a result to control a remote device, the result based on the adjusted first set of original target values, the remote device including at least one selected from a group consisting of a pole sign and a billboard.

18. The computer-readable medium of claim 17, wherein the set of functions further comprises:

determining a second set of optimal variable values for a second single time-step optimization problem for a second time-step included in the plurality of succeeding time-steps, determining a second resulting value of the secondary parameter based on the second set of optimal variable values, determining a second divergence of the second resulting value from a second target value of the secondary parameter, re-determining the cumulative target divergence based on the first divergence and the second divergence, determining a second set of target value adjustments for a second plurality of succeeding time-steps based on the re-determined cumulative target divergence, wherein the second plurality of succeeding time-steps are associated with a second subset of the plurality of successive single time-step optimization problems succeeding the second single time-step optimization problem, adjusting a second set of original target values of the secondary parameter for the second plurality of succeeding time-steps based on the second set of target value adjustments, and outputting the adjusted second set of original target values for display.

19. The computer-readable medium of claim 17, wherein the set of functions further comprises:

determining the set of weights, wherein the first set of target value adjustments is based on the cumulative target divergence and the set of weights.

20. The computer-readable medium of claim 17, wherein determining the set of weights includes determining a first sub-set of weights based on a preference for responsiveness in recovering a target divergence, determining a second sub-set of weights based on a time-based variation in the secondary parameter, multiplying the first sub-set of weights and the second sub-set of weights, and rescaling a result of multiplying the first sub-set of weights and the second sub-set of weights such that the set of weights satisfy the preference for responsiveness in recovering the target divergence.

* * * * *